(12) United States Patent
Lottermoser et al.

(10) Patent No.: US 12,120,585 B2
(45) Date of Patent: *Oct. 15, 2024

(54) MESSAGING SYSTEM INTERACTING WITH DYNAMIC EXTENSION APP

(71) Applicant: Apple Inc., Cupertino, CA (US)

(72) Inventors: Stephen M. Lottermoser, San Jose, CA (US); Pierre J. De Filippis, Sunnyvale, CA (US); David Alex Carter, Cupertino, CA (US); Eugene Bistolas, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,230

(22) Filed: Aug. 7, 2023

(65) Prior Publication Data

US 2023/0388759 A1     Nov. 30, 2023

Related U.S. Application Data

(63) Continuation of application No. 17/867,616, filed on Jul. 18, 2022, now Pat. No. 11,722,860, which is a
(Continued)

(51) Int. Cl.
*H04W 4/14*     (2009.01)
*G06F 3/0484*     (2022.01)
(Continued)

(52) U.S. Cl.
CPC ............ *H04W 4/14* (2013.01); *G06F 3/0484* (2013.01); *G06F 9/46* (2013.01); *H04L 51/04* (2013.01);
(Continued)

(58) Field of Classification Search
None
See application file for complete search history.

(56) References Cited

U.S. PATENT DOCUMENTS 9,754,018 B2 * 9/2017 Olenick ................... G06F 8/34
10,282,273 B1   5/2019 Bell
(Continued)

FOREIGN PATENT DOCUMENTS

CN        1976322       6/2007
CN        101159705 A   4/2008
(Continued)

OTHER PUBLICATIONS

Xu et al., "Research and Implementation of Content Extension in Instant Messaging in Java," Software Guide, 2015, vol. 14, No. 12, including English language abstract.
(Continued)

*Primary Examiner* — Quang N Nguyen
(74) *Attorney, Agent, or Firm* — BAKERHOSTETLER (57) ABSTRACT

A messaging system includes a first messaging app on a first device and a second messaging app, on a second device, that can exchange messages (e.g. text messages, etc.), and the second messaging on can transmit content from a second extension app that operates with the second messaging app to the first messaging app that operates with a first extension app. The content can be opaque to the messaging app, but can be processed by the extension apps to display live, dynamic content in message bubbles in a message transcript of a conversation.

20 Claims, 9 Drawing Sheets

Related U.S. Application Data continuation of application No. 17/087,540, filed on Nov. 2, 2020, now Pat. No. 11,395,110, which is a continuation of application No. 15/902,507, filed on Feb. 22, 2018, now Pat. No. 10,827,319.

(60) Provisional application No. 62/514,742, filed on Jun. 2, 2017.

(51) Int. Cl.
*G06F 9/46* (2006.01)
*H04L 51/04* (2022.01)
*H04L 51/046* (2022.01)
*H04L 67/02* (2022.01)
*H04W 4/12* (2009.01)
*H04L 51/18* (2022.01)

(52) U.S. Cl.
CPC ............ *H04L 51/046* (2013.01); *H04L 67/02* (2013.01); *H04W 4/12* (2013.01); *H04L 51/18* (2013.01)

(56) References Cited

U.S. PATENT DOCUMENTS

| | | | |
|---|---|---|---|
| 10,318,318 B2* | 6/2019 | Liggitt | ............. H04L 67/34 |
| 10,439,965 B1 | 10/2019 | Guarraci | |
| 10,649,679 B2* | 5/2020 | Gill | ............. G06F 9/5072 |
| 10,785,175 B2 | 9/2020 | Yip | |
| 2002/0194293 A1 | 12/2002 | Osman | |
| 2004/0030719 A1 | 2/2004 | Wei | |
| 2009/0225760 A1 | 9/2009 | Foti | |
| 2010/0138515 A1 | 6/2010 | Ruiz-Velasco | |
| 2010/0169413 A1 | 7/2010 | Kim | |
| 2012/0079039 A1 | 3/2012 | Imai | |
| 2012/0166992 A1* | 6/2012 | Huynh | ............. H04L 12/2816 715/771 |
| 2013/0282755 A1 | 10/2013 | Procopio | |
| 2014/0032691 A1 | 1/2014 | Barton | |
| 2014/0310335 A1 | 10/2014 | Snibbe | |
| 2015/0012837 A1 | 1/2015 | Momchilov | |
| 2015/0095759 A1* | 4/2015 | Olenick | ............. G06F 3/0481 715/234 |
| 2015/0163178 A1 | 6/2015 | Jeon | |
| 2015/0263997 A1 | 9/2015 | Abate | |
| 2015/0312176 A1 | 10/2015 | Jones et al. | |
| 2015/0334184 A1 | 11/2015 | Liverance | |
| 2016/0277329 A1 | 9/2016 | Gordon et al. | |
| 2016/0314504 A1 | 10/2016 | Clark et al. | |
| 2016/0360336 A1 | 12/2016 | Gross et al. | |
| 2017/0249177 A1* | 8/2017 | Liggitt | ............. G06F 9/45558 |
| 2017/0357415 A1 | 12/2017 | Peterson | |
| 2017/0357432 A1 | 12/2017 | King | |
| 2017/0359279 A1 | 12/2017 | Peterson | |
| 2017/0359281 A1 | 12/2017 | Yip | |
| 2017/0359282 A1 | 12/2017 | Alsina | |
| 2017/0359285 A1 | 12/2017 | Weinig | |
| 2017/0359702 A1 | 12/2017 | Peterson | |
| 2017/0359703 A1 | 12/2017 | Ciechanowski | |
| 2018/0335939 A1 | 11/2018 | Karunamumi | |
| 2020/0186489 A1 | 6/2020 | Chen | |
| 2020/0327005 A1 | 10/2020 | Singh | |
| 2021/0397313 A1* | 12/2021 | Desai | ............. G06F 9/451 |

FOREIGN PATENT DOCUMENTS

| | | |
|---|---|---|
| CN | 102143441 | 8/2011 |
| CN | 102158431 A | 8/2011 |
| CN | 102281206 | 12/2011 |
| CN | 104184782 A | 12/2014 |
| CN | 106656747 A | 5/2017 |
| CN | 106797338 | 5/2017 |
| EP | 3255909 | 12/2017 |
| WO | WO 2006/60402 | 6/2006 |
| WO | WO 2015/50966 | 4/2015 |
| WO | WO 2015/183456 | 12/2015 |

OTHER PUBLICATIONS

Chinese Office Action from Chinese Patent Application No. 201880035631.3, dated Apr. 25, 2021, 29 pages including English language translation.
Chinese Office Action from Chinese Patent Application No. 201880035631.3, dated Dec. 27, 2021, 7 pages including English language translation.
European Office Action from European Patent Application No. 18722837.4, dated Mar. 10, 2021, 12 pages.
European Office Action from European Patent Application No. 18722837.4, dated Apr. 28, 2023, 14 pages.
International Search Report and Written Opinion from PCT/US2018/027826, dated Jul. 11, 2018, 17 pages.
Chinese Notice of Allowance from Chinese Patent Application No. 202210235242.3, dated Jan. 9, 2024, 6 pages including machine-generated English language translation.

* cited by examiner

MESSAGING SYSTEM INTERACTING WITH DYNAMIC EXTENSION APP

This application is a continuation of U.S. application Ser. No. 17/867,616, entitled "Messaging System Interacting With Dynamic Extension App", filed Jul. 18, 2022, and issued on Aug. 8, 2023 as U.S. Pat. No. 11,722,860, which is a continuation of U.S. patent application Ser. No. 17/087,540, entitled "Messaging System Interacting With Dynamic Extension App", filed Nov. 2, 2020, and issued on Jul. 19, 2022 as U.S. Pat. No. 11,395,110, which is a continuation of U.S. patent application Ser. No. 15/902,507, entitled "Messaging System Interacting with Dynamic Extension App", filed on Feb. 22, 2018, and issued on Nov. 3, 2020 as U.S. Pat. No. 10,827,319, which claims the benefit of U.S. Provisional Patent Application No. 62/514,742, entitled "Messaging System Interacting with Dynamic Extension App", filed on Jun. 2, 2017, the disclosure of each of which is hereby incorporated herein in its entirety.

BACKGROUND

The embodiments described in this disclosure relate to messaging systems such as text messaging systems on cellular telephones or other communication devices or data processing systems.

The use of text messaging systems began many years ago. For example, wireless cellular telephone carriers, such as Verizon or AT&T, allowed text messages through the Short Message Service (SMS) for cell phones in the 1990s before smartphones were available. Typically, the amount of data transmitted has been limited by rules established by the carriers. Recently, as the use of smartphones (e.g. iPhones) and tablet computers (e.g. iPad) has increased, the text messaging systems have developed the ability to send images, such as photos or emojis. In addition, messaging systems such as iMessage from Apple Inc. of Cupertino, California have allowed users to also send and receive text and images through "public" networks which include "public" WiFi access points and the Internet (in addition to using the wireless carrier's private cellular telephone networks), and messaging systems such as iMessage can seamlessly transition between the use of public and private networks depending on the availability of, for example, WiFi access points or the compatibility of the other user's device (which may not be compatible with iMessage).

SUMMARY OF THE DESCRIPTION

The embodiments described herein operate in a messaging system that includes a first messaging application or app on a first device and a second messaging application, on a second device, that can exchange messages such as text messages, etc. The first messaging app and the second messaging app can each be configured to operate with a corresponding extension app to provide content that is viewable within a message transcript provided by the user interface of each of the messaging apps. In one embodiment, a method can include the following operations: receiving, by a first messaging application (app) on a first device, a message and metadata from a second device, the message including content created by a second extension app that operated with a second messaging app on the second device; launching a first extension app, if it is installed on the first device, in response to receiving the content, the first extension app being identified for launching by an app identifier in the metadata; displaying, after the launching, a user interface of the first extension app within a message container within a message transcript of the first messaging app, wherein the user interface is configured to provide output, which is dynamic, from the first extension app in the message container. In one embodiment, the output which is dynamic can change over time and thus it is not static. The change can occur in response to inputs from the user or processes performed by the first extension app, and the change can occur without receiving any new content from the sending device such as the second device.

In one embodiment, the message container is a message bubble that is specified by a bubble identifier in the metadata, and the content is associated with the bubble identifier. In one embodiment, the first extension app generates the output of the first extension app within the message container based on the content received from the second messaging app. In one embodiment, the user interface of the first extension app in the message bubble is configured to receive one or more inputs for the first extension app in addition to receiving an output from the first extension app. In one embodiment, the first and the second messaging apps are each configured to transmit short message service (SMS) text messages and other content and display the text messages in message bubbles in the message transcript; in one embodiment, the first messaging app and the first extension app are configured to communicate through an interprocess communication (IPC). In one embodiment, the first messaging app executes in a first sandboxed process and the first extension app executes in a second sandboxed process that is distinct from the first sandboxed process.

In one embodiment, the first extension app can have a further user interface which replaces an on-screen keyboard of the first messaging app after the message bubble containing content generated by the first extension app receives an input. In one embodiment, the content is displayed in the message bubble by the first messaging application without launching or executing the first extension app, and the content as displayed before the launching is a snapshot created by the first extension app or the second extension app. In one embodiment, an application program interface (API) can exist between the first messaging app and the first extension app. In one embodiment, the first messaging app offers to download and install the first extension app if the first extension app is not installed.

In one embodiment, the first extension app can modify the content and pass the modified content to the first messaging app, through an interprocess communication, for transmission to the second messaging app for delivery to the second extension app on the second device. In one embodiment, the first extension app can receive a call back from the first messaging app which indicates whether the transmission was successful or not. In one embodiment, the first extension app can be configured to process the content created by the second extension app, and the second extension app and the first extension app can be identified by the same app identifier. In one embodiment, the first extension app can call through an API to the first messaging app to request a change of the first extension app's view within the first messaging app, and this change can be one of (a) a switch from a compact view that replaces the on-screen keyboard of the messaging app to an expanded view; or (b) a switch from the expanded view to the compact view; or (c) dismissal of the extension app's view. In one embodiment, the message transcript of the first messaging app is viewable when the compact view of the first extension app is displayed.

In one embodiment, the user interface provided by the first extension app in the message bubble is provided through an instance of a remote view controller that is embedded in the message bubble to allow the first extension app to create live dynamic output in the message bubble. In one embodiment, the message transcript can include multiple message bubbles, some of which use a static, template-based content from another extension app operating with the first messaging app. In one embodiment, the live dynamic output changes in response to user inputs in the message bubble or in a compact view of the first extension app. In one embodiment, the first extension app can be configured to provide live dynamic content through multiple instances of remote view controllers, with each instance of the multiple instances being associated with a corresponding message bubble in the transcript which shows live dynamic output from the first extension app.

In one embodiment, the first extension app can also provide a further user interface in a message staging area or input staging area which is configured to receive a message input or other content to be sent; a user typically enters content into the input staging area before it is sent and then selects a send command to cause the content to be sent. Hence, in this embodiment, the first extension app can control both the input into and the output shown in the input staging area in this embodiment.

In one embodiment, the first messaging app manages a lifecycle of the first extension app based on one or more of: (a) an open or closed state of the messaging app; (b) a switch to a different conversation that does not include the message bubble having content generated by the first extension app; (c) a limit on a number of view controllers for the first extension app; (d) a limit on a number of view controllers for the first extension app and any other extension apps in the message transcript; or (e) whether the message bubble containing the content generated by the first extension app is on-screen or off-screen. In one embodiment, the launching of the first extension app occurs when the message bubble containing the content generated by the first extension app is on-screen but does not occur when the message bubble is off-screen.

In one embodiment, a method can include the following operations: receiving, by a first messaging application (app) on a first device, a message and metadata from a second device, the message including content created by a second extension app on the second device; determining whether a message container currently is on-screen in a message transcript of a conversation, the message transcript provided as a displayed output of the first messaging app, and the message container including an output generated from the content; launching a first extension app, if it is installed on the first device, in response to determining the message container is on-screen, the first extension app being identified by an app identifier in the metadata; displaying, after the launching, a user interface of the first extension app within the message container in the message transcript.

The methods and systems described herein can be implemented by data processing systems, such as one or more smart phones, tablet computers, desktop computers, laptop computers, smart watches, wearable devices, audio accessories, onboard computers, and other data processing systems and other consumer electronic devices. The methods and systems described herein can also be implemented by one or more data processing systems which execute executable computer program instructions, stored in one or more non-transitory machine readable media or medium that cause the one or more data processing systems to perform the one or more methods described herein when the program instructions are executed. Thus, the embodiments described herein can include methods, data processing systems, and non-transitory machine readable media such as DRAM memory and flash memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1A:
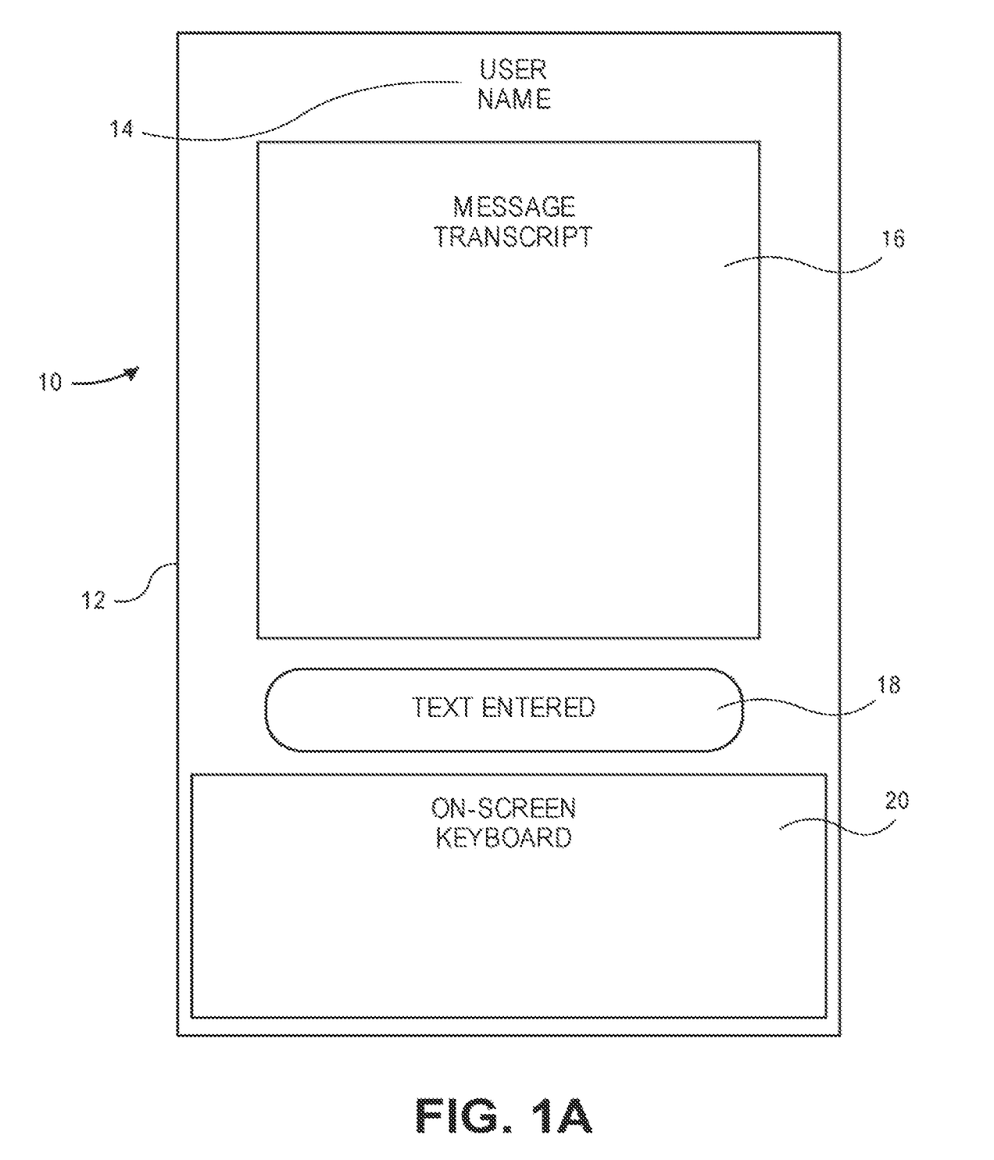
FIG. 1A shows an example of a user interface for a messaging app on a communication device.

The various embodiments described herein relate to messaging systems such as text messaging systems or "chat" messaging systems or other systems which allow devices to communicate messages between the devices. For example, iMessage from Apple Inc. of Cupertino, California is an example of a messaging service for iOS devices and Mac (OS X) computers. Typically, a messaging system includes the plurality of client devices, each including at least one messaging app, and a set of one or more messaging servers that can receive messages from client devices and transmit messages to client devices. FIG. 1A shows an example of a user interface of a messaging app on a client device. The client device can be a communication device 10 which can be a smartphone, or tablet computer, or a desktop computer or a laptop computer, wearable, on-board computer, or other data processing systems or other consumer electronics devices. In one embodiment, the device can include a conventional touch screen that can both display images and also accept touch inputs from a user. The touch screen 12 on the communication device can display the user interface of the messaging app which can include a message transcript 16 and an on-screen keyboard 20 below the message transcript 16. In addition, the user interface of the messaging app can include a user name 14 indicating the recipient, in one embodiment, of messages sent from the communication device 10. In addition, the user interface can include a text entry region 18 which indicates the content of the text entered by the user before it is sent; in a sense, the text entry region 18 is a text staging area indicating text that is ready to be sent to the recipient.

Figure 1B:
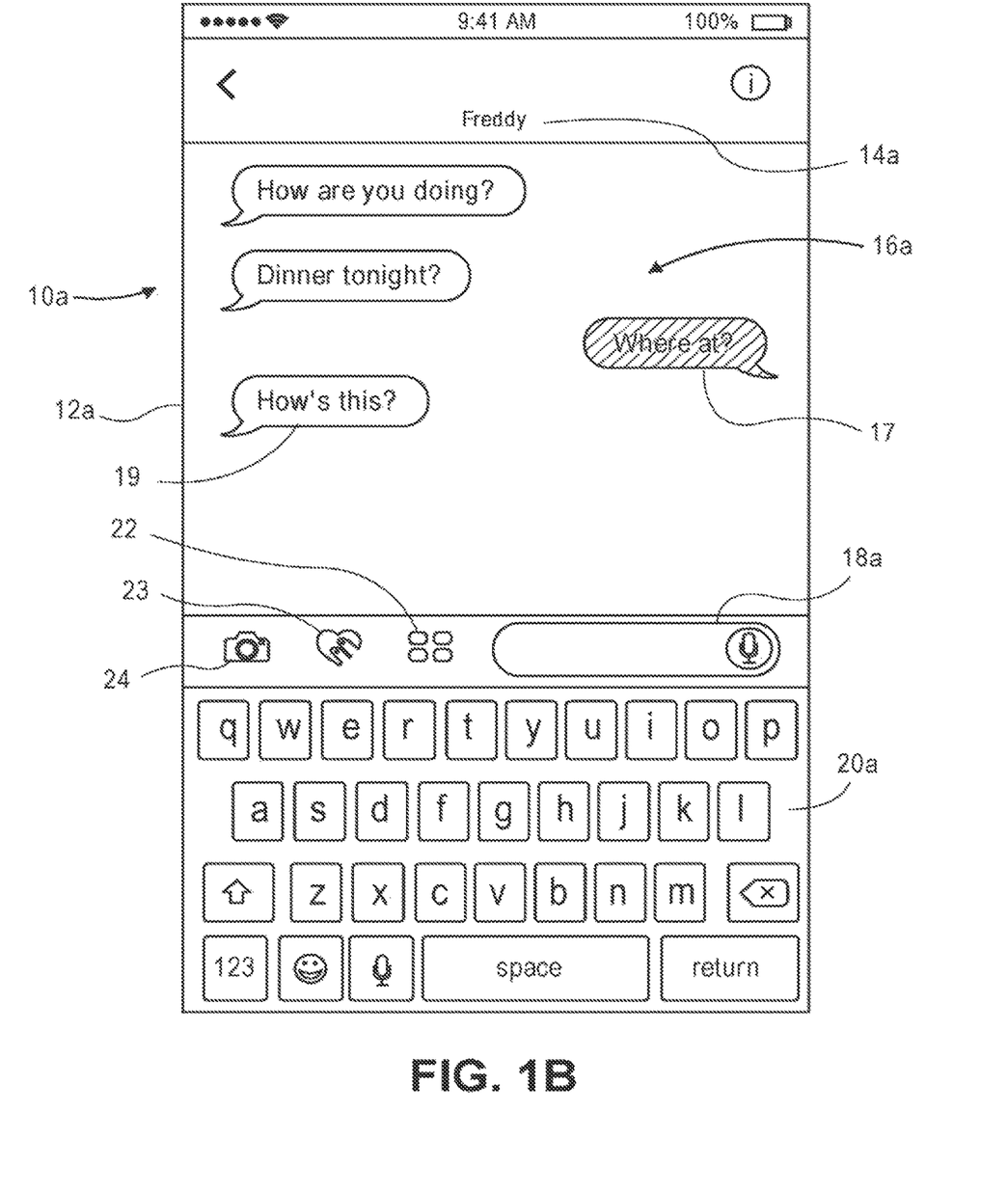
FIG. 1B shows another example of a user interface for a messaging app on a communication device.

FIG. 1B shows a more detailed example of a user interface of a messaging app on a communication device 10A. The user interface is displayed in this embodiment on touch screen 12A and includes on-screen keyboard 20A, text entry region 18A, a message transcript 16A and a user name 14A showing the name of the other user(s) to whom messages are sent and from whom messages are received. The text entry region 18A is a staging area for content such as one or more of text, stickers, extension app content, images etc. which are ready to be sent in response to the user's selection of the send command (and in one embodiment, the content can be edited in the staging area). In the example shown in FIG. 1B, messages from Freddy (user name 14A) are shown on the left side of the message transcript 16A and messages sent by the user of communication device 10A are shown on the right side of message transcript 16A. Hence, message bubble 17 shows the message "Where at?" sent by the user of communication device 10A to Freddy as a response to the message from Freddy "Dinner tonight?". The message in message bubble 17 causes Freddy to respond with "How's this?" shown in message bubble 19. The use of the word "bubble", such as message bubble or session bubble, etc. is not meant to imply any specific shape or form; rather it is intended to mean any shape or form of demarcation between messages between two or more participants, and thus the demarcation can use boxes or lines or message containers or different colors, etc. Thus the phrase "message bubble" is meant to cover all such demarcations (or other ways to distinguish) between messages between two or more participants, and particularly in the context of such demarcations or other ways to distinguish in a message transcript. In one embodiment, the message transcript can be scrolled up and down and messages in the message transcript are presented in sequence according to their time, thus the user can see the actual chat or conversation over time by scrolling the view up or down. The user interface shown in FIG. 1B also includes three icons 22, 23, and 24 above the on-screen keyboard 20A and to the left of the text entry region 18A. The extension apps view icon 22, when selected, causes the display of a view of the installed extensions app that can operate with the messaging app, and the view provided can be a browsable view to allow the user to scroll through multiple pages showing all of the installed extension apps that are configured to operate with the messaging app according to the one or more embodiments described herein. The imaging app icon 23 can in one embodiment be an icon that when selected causes the launching of a plugin of the messaging app that provides image creation within the messaging app's process. The camera app icon 24 in one embodiment can, when selected, cause the communication device 10A to enter into a camera mode in which a camera of a device can capture still images or video images which can be placed into the message in order to send the image or video.

Figure 2:
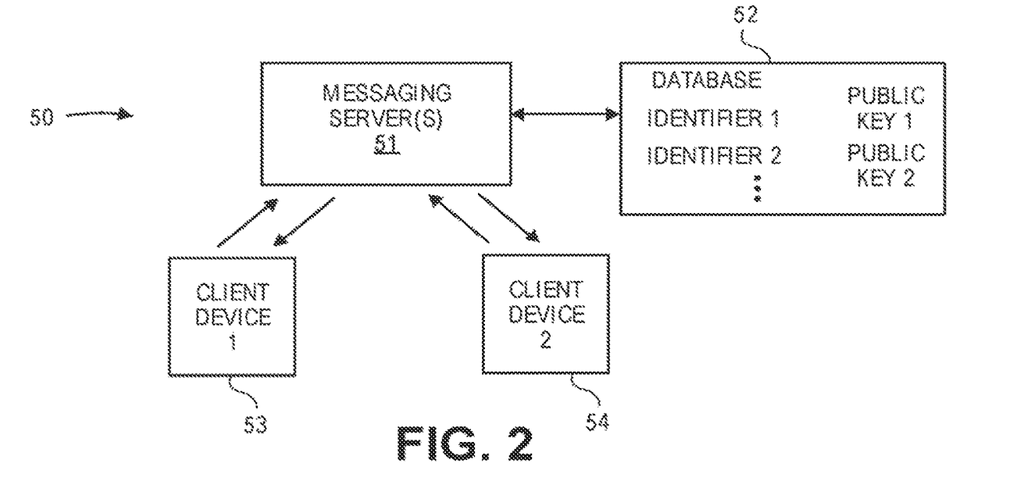
FIG. 2 shows an example of a messaging system which employs one or more messaging servers to provide a messaging service to a set of client devices.

A brief overview of an example of a messaging system will now be provided in conjunction with FIG. 2. A messaging system 50 can include a plurality of client devices, such as client devices 53 and 54. Each of these client devices can include at least one messaging app that is configured to operate with extension apps according to the one or more embodiments described herein and also communicate at least text messages and optionally resource locators or images or other content for devices that are not compatible with the extension app architecture in a messaging app. In a typical messaging system, there can be millions of client devices communicating through a set of messaging servers. In one embodiment, a plurality of messaging servers can be configured to receive encrypted messages from sending devices and then transmit those encrypted messages to the receiving devices. Another set of servers can be configured to receive non-text content, such as images or other "attachments" and provide those images or attachments in download operations to receiving devices in response to requests from those receiving devices to obtain the images or attachments. In one embodiment, a sender's outgoing message is individually encrypted for each of the receiver's devices. In one embodiment, an asymmetric RSA encryption algorithm can be used to perform the encryption. In one embodiment, the public RSA encryption keys of each of the receiving devices can be retrieved from a directory service (maintained by the one or more messaging servers) which includes a database, such as a database 52 which is coupled to the one or more messaging servers 51. When a client device, such as client device 53 seeks to send a message to another client device, it identifies the other client device (such as by an email address or a telephone number or other identifier) to the one or more messaging servers 51. That identifier is sent from the client device, such as client device 53 to one or more messaging servers 51 which then perform a lookup operation in the database 52 based upon the supplied identifier to retrieve the public key that corresponds to that identifier. That public key is then transmitted back to the client device which requested the public key for that particular receiving device, and then the client device can encrypt the message using the public key or using another key (e.g. a symmetric key) which can be randomly generated, and that other key is encrypted with the public RSA encryption key for the particular receiving device. In one embodiment, the randomly generated key can be randomly generated on a per message basis. In one embodiment, the resulting messages, one for each receiving device, consists of the encrypted message text, the encrypted message key, and the sender's digital signature, and this resulting message for each receiving device is then uploaded to the one or more messaging servers 51 for delivery to the recipient client devices, such as client device 54. In one embodiment, the messaging system 50 can be configured to operate through "public" networks which include public WiFi access points (such as WiFi access points in coffee shops, airports, etc.) and also the Internet. The messaging apps on each of the client devices 53 and 54 can also be configured to operate with the "private" networks provided by wireless cellular telephone carriers, such as Verizon and AT&T, and the messaging apps can be configured to seamlessly switch between the use of the private and public networks depending upon the availability of each and also depending upon the compatibility of each of the client devices in a messaging session. In one embodiment, the messaging servers 51 can include a set of push notification servers which receive the uploaded text messages and which "push" those text messages to receiving devices.

A messaging system in one embodiment on a client device includes a messaging app and one or more extension apps that each operate as separate processes. In one embodiment, the message app and the one or more extension apps can each be separate sandboxed processes that operate or execute in their own memory spaces. In addition, the messaging app can also operate with plug-ins, such as an image creation plug-in or other plug-ins which operate within the same process and memory space as the messaging app. The messaging app and each extension app communicate with each other through an interprocess communication, such as the XPC framework provided in iOS and Mac OS X. The messaging app is designed to receive text on a sending device from a user of the device and display the text in a message transcript and send the text, through a set of one or more messaging servers, to a receiving device which displays, through a counterpart messaging application on the receiving device, the received text in a message transcript on the receiving device. The receiving device and the sending device can each have a copy of the same extension app which are configured to create content of a certain type depending upon the particular extension app (or, in an alternative embodiment, each can include a copy of different extension apps that are compatible for the content used by them).

Figure 3A:
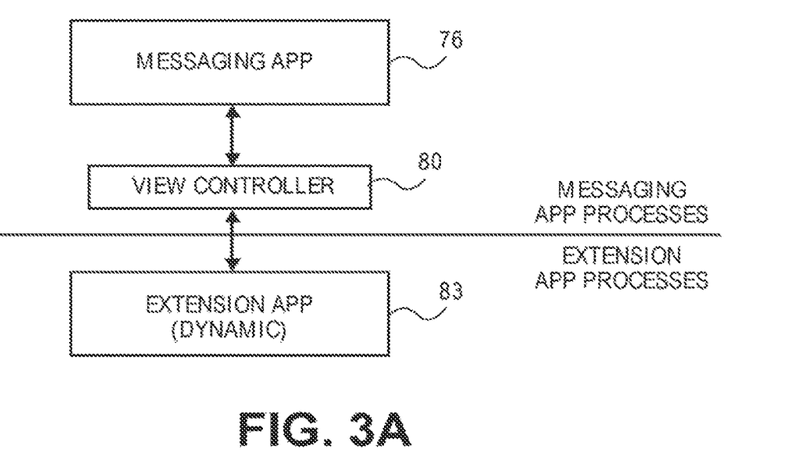
FIG. 3A shows a block diagram of an architecture for providing extension apps for use with a messaging app according to the one or more embodiments described herein.

FIG. 3A is an example of a software architecture in which a messaging app and one or more extension apps operate together to provide an enhanced messaging system. The messaging system shown in FIG. 3A includes a messaging app 76, an extension app 83 which can provide dynamic content, and a view controller 80. In one embodiment, the messaging app 76 allows for the selection of a conversation from a list of conversations that have occurred in a messaging account used by the messaging app 76. The messaging app 76 can create the message transcript for a selected conversation and can also allow for the creation of a new conversation as well as the deletion of existing conversations. In one embodiment, the messaging app 76 provides for operability through interprocess communication (IPC) with one or more extension apps designed to operate with the messaging app 76. In one embodiment, the messaging app 76 can execute processes and tasks in its sandbox while the extension app, such as extension app 83, can execute processes and tasks in its own sandbox, which is separate and distinct from the sandbox environment of the messaging app 76. In one embodiment, each extension app can operate within its own sandbox, which can include limitations on memory which can be accessed by each process as well as the permissions granted to each process. In one embodiment, the extension apps can be provided with fewer system permissions relative to the messaging app so that the extension apps operate in a more restricted environment than the messaging app.

The extension app 83 can be an extension app that generates dynamic, live content for display in, for example, one or more message bubbles in the transcript. In one embodiment, the extension app 83 can also generate dynamic, live content in an input staging area, such as the input staging area 153 shown in FIG. 4C and the input staging area 407 shown in FIG. 9. The message bubbles that display the dynamic live content from the extension app 83 are examples of user interfaces provided by the extension app 83. Similarly, the output of the extension app 83 which is displayed in, for example, the input staging area is another example of the user interface of the extension app 83. In some instances, these user interfaces can both display an output as well as receive inputs, such as touch inputs or other inputs directed toward the user interface, and these inputs can be received by the extension app 83 and processed according to the internal processes of the extension app 83. The dynamic, live content is not static and can change over time, and can change based upon inputs from the user on the data processing system or based upon inputs from the data processing system or based upon processes in the extension app 83. In one embodiment, the user interface of the extension app, such as extension app 83, within a bubble or other areas of the messaging app, such as the input staging area, can be provided through one or more view controllers such as a remote view controller used in applications that operate on the operating system iOS from Apple Inc. of Cupertino, California in one embodiment. In one embodiment, each message bubble can have its own instance of a remote view controller which provides the user interface of the extension app, such as extension app 83. Similarly, the user interface of an extension app which provides dynamic content for an input staging area can also have its own instance of a remote view controller for the input staging area. One message transcript for a conversation can have multiple message bubbles from a single dynamic extension app, and the message transcript can also include message bubbles from other dynamic extension apps. Thus, it is possible for a message transcript to concurrently require or support multiple view controllers for the multiple message bubbles within the transcript for the one or more dynamic extension apps. In one embodiment, the view controllers are kept in a cache in memory. In one embodiment, the number of view controllers can be limited in that cache in order to control resource usage by the messaging system. In one embodiment, the messaging app 76 can also work with extension apps that have static content presented within one or more message bubbles. Examples of extension apps that have static content are described in U.S. patent application Ser. No. 15/275,136, filed Sep. 23, 2016, entitled "Messaging Application Interacting with One or More Extension Applications," which application is hereby incorporated herein by reference in its entirety.

In one embodiment, the extension apps which are configured to operate with a messaging app are not executable outside of the messaging app, and thus their lifecycle is managed entirely by the messaging app. Moreover, as described in U.S. patent application Ser. No. 15/275,136, filed Sep. 23, 2016, the downloading and installing of the extension apps can be controlled exclusively by the messaging app in one embodiment.

Figure 3B:
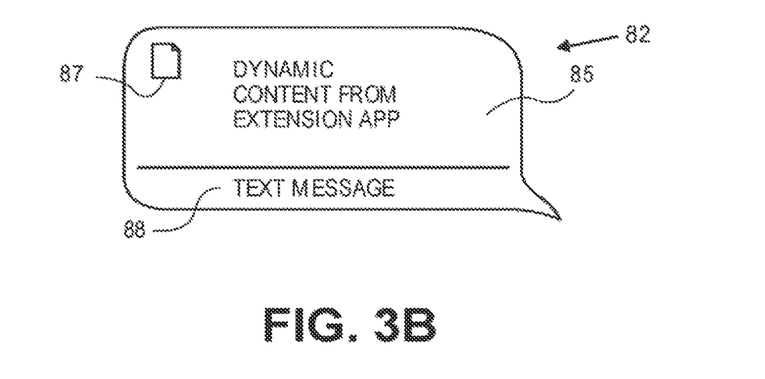
FIG. 3B shows an example of a user interface of a message bubble created at least in part by an extension app according to one embodiment herein.

FIG. 3B shows an example of a message bubble 82 which includes dynamic content 85 from a dynamic extension app, such as dynamic extension app 83, which is configured to provide a dynamic live user interface for message bubbles and other items within the messaging app through, for example, one or more remote view controllers as described above. The dynamic content 85 can include an icon 87 which can be the icon of the extension app which created the dynamic content 85. Moreover, the message bubble 82 can also include a text message 88, which is optional, and which contains text from a source such as the sender of the message or the messaging app or extension app on the sender's device.

Figure 4A:
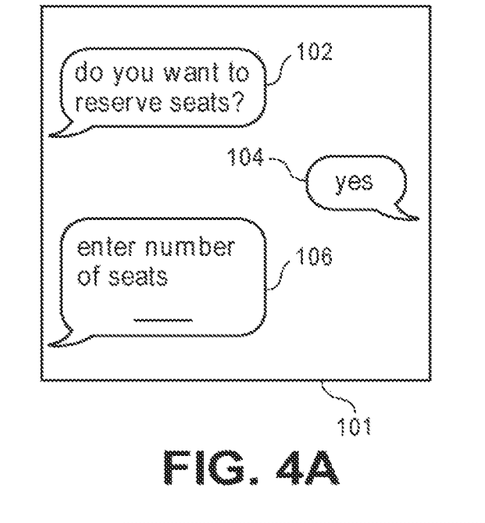
FIG. 4A shows an example of a message bubble containing dynamic content generated by an extension app according to one embodiment herein.
Figure 4B:
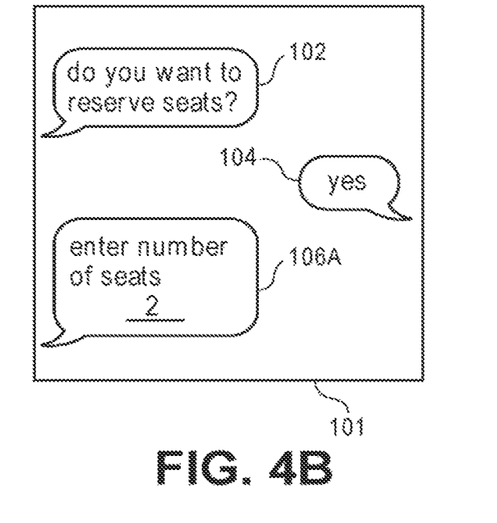
FIG. 4B shows an example of the message bubble shown in FIG. 4A after a user has provided an input into the message bubble according to one embodiment herein.

FIGS. 4A and 4B show an example of a messaging app which operates with a dynamic extension app in order to provide dynamic, live content in one or more message bubbles within the message transcript of the conversation provided by the messaging app. The transcript 101 includes three message bubbles which are labeled as message bubble 102, message bubble 104, and message bubble 106. In one embodiment, message bubbles 102 and 106 can be generated by a dynamic extension app, such as the extension app 83 shown in FIG. 3A. Message bubble 104 can display text entered by the user of the device which is executing the messaging app that displays the transcript 101. In one embodiment, the sender of content in message bubble 102 and 106 can be a restaurant, which has its own extension app installed on the user's device, and this extension app can generate the dynamic live content in message bubble 106. In one embodiment, the output of the message bubble can change from message bubble 106 shown in FIG. 4A to message bubble 106A shown in FIG. 4B in response to an input from the user. For example, in one embodiment, the user may tap on message bubble 106 which causes the presentation of a slider user interface from which a user can select a number of seats to reserve. Alternatively, other known user interfaces for selecting a number could also be used (such as an on-screen keyboard). In any case, the user's interaction with the user interface through message bubble 106 can allow a user to enter an input into the message bubble 106, and that input can then be provided to the dynamic extension app which can then provide data based upon that input back to the sender of message bubble 106 (for example, see FIG. 10). In an alternative embodiment, a compact view of the extension app that generates the dynamic content shown in message bubble 106 can receive the input from the user, which then causes the output of the message bubble 106A to be displayed which reflects a change relative to message bubble 106.

It will be appreciated that many different inputs can be received within the user interface generated by the dynamic extension app, and many different types of outputs can be in response to those inputs generated and displayed within a dynamic message bubble or other regions of the user interface of the messaging app.

Figure 4C:
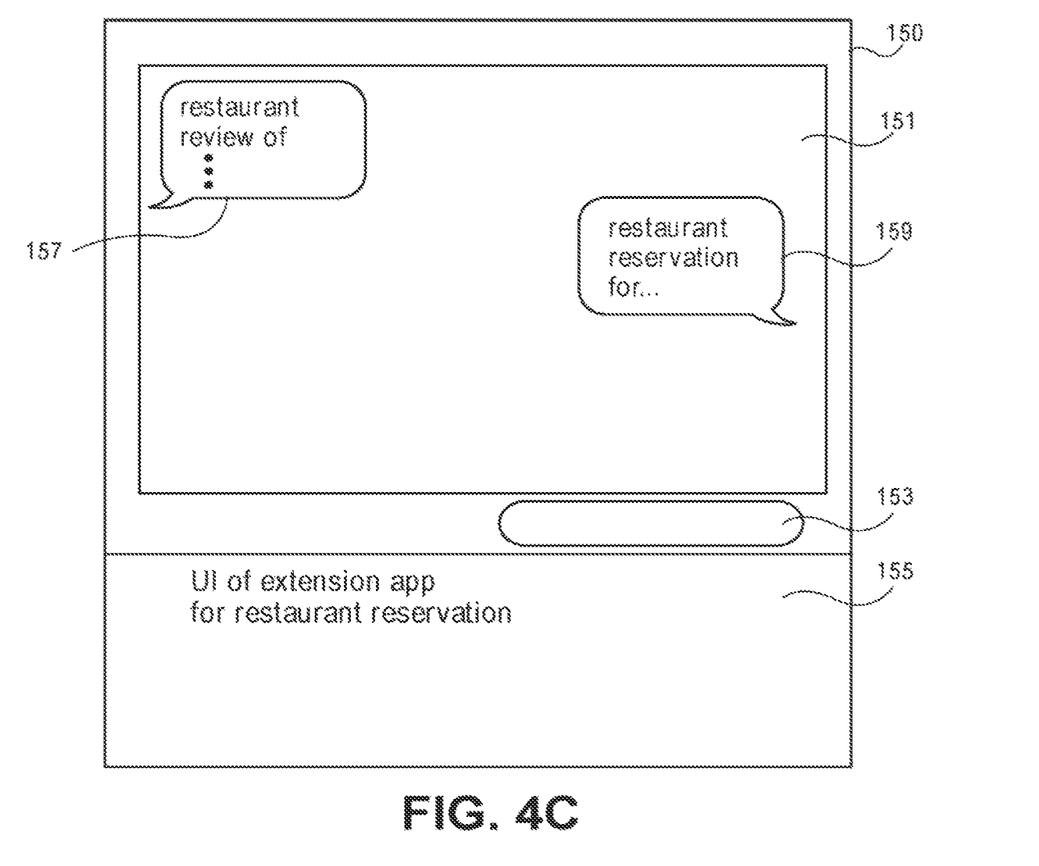
FIG. 4C shows an example of the user interface of a messaging app which includes, in the transcript of the messaging app, two dynamic message bubbles from two different extension apps that are operating with the messaging app in the embodiment of FIG. 4C.
Figure 9:
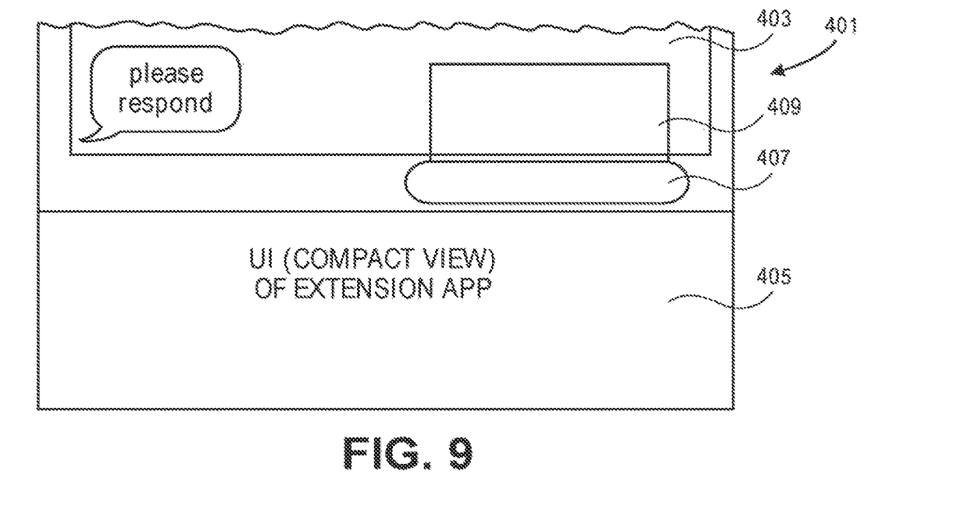
FIG. 9 shows an example of an extension app controlling the input staging area in a messaging app according to one embodiment.

FIG. 4C shows an example of a user interface of a messaging app 150 which displays a transcript 151 of the messages in a conversation. The viewable portion of this transcript includes message bubbles 157 from a first extension app and message bubble 159 from a second extension app. In one embodiment, the message app which generates the content of message bubble 157 can be a dynamic extension app, and the extension app which generates the dynamic content of message bubble 159 can also be a dynamic extension app. Thus, both message bubbles 157 and 159 can be dynamic live message bubbles in which the content can change under control of the respective extension app. Moreover, message bubble 157 and message bubble 159 can each receive inputs and provide those inputs to their respective dynamic extension apps. For example, the restaurant review shown in message bubble 157 can receive user inputs indicating the user's thoughts or comments or review of a particular restaurant. The user interface provided by the extension app which displays dynamic content within message bubble 159 can also receive inputs to reserve seats at a particular restaurant. In the example shown in FIG. 4C, the extension app for restaurant reservation includes its compact view 155 in the area where the on-screen keyboard is normally displayed. In this example, user input can be received in either the compact view 155 or within message bubble 159 in order to create a reservation at a restaurant. In another embodiment, the extension app for a restaurant reservation which controls the compact view 155 and which also controls the message bubble 159 can also generate a user interface within the input staging area 153, and FIG. 9 shows an example of such a user interface in an input staging area.

Figure 5:
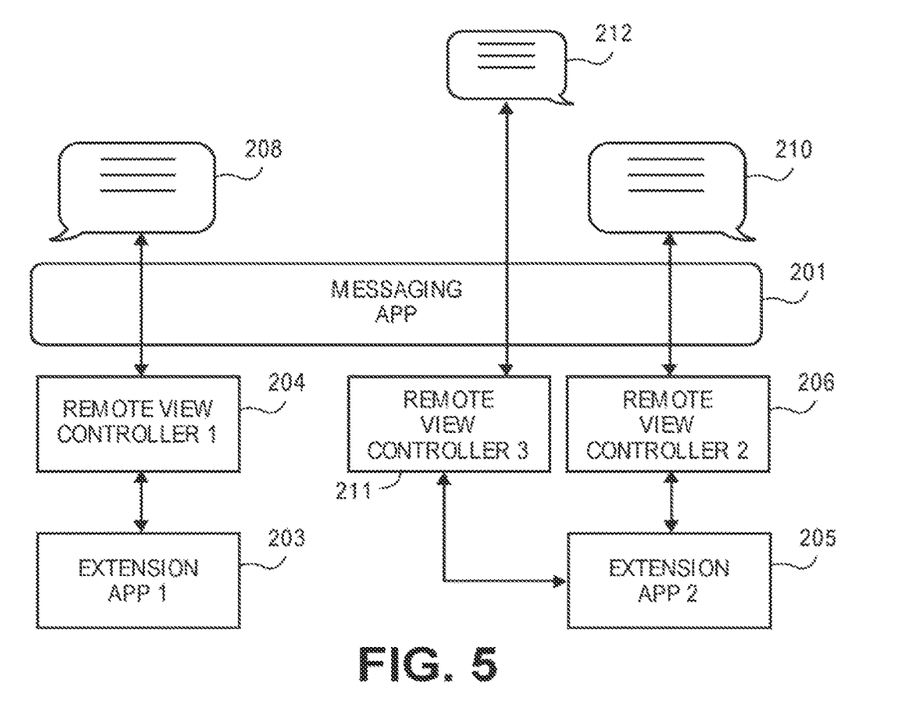
FIG. 5 shows an example, in block diagram form, of an architecture of a messaging app operating with multiple extension apps through multiple remote view controllers according to one embodiment described herein.

FIG. 5 shows an example of a software architecture which can be used to implement the messaging system shown in FIG. 4C. In the example shown in FIG. 5, the messaging app 201 allows two different extension apps to control at least one message bubble in a message transcript of a conversation. In the example shown in FIG. 5, dynamic extension app 203 uses a remote view controller 204 to generate a dynamic user interface within the message bubble 208. The dynamic extension app 205 has one instance of a remote view controller for each message bubble in the transcript. In particular, extension app 205 uses remote view controller 211 to provide a dynamic user interface within message bubble 212, and also uses the remote view controller 206 to provide a dynamic user interface within message bubble 210. In one embodiment, a separate instantiation or instance of a remote view controller is provided for each and every message bubble for a particular extension app that provides content to those message bubbles.

Figure 6:
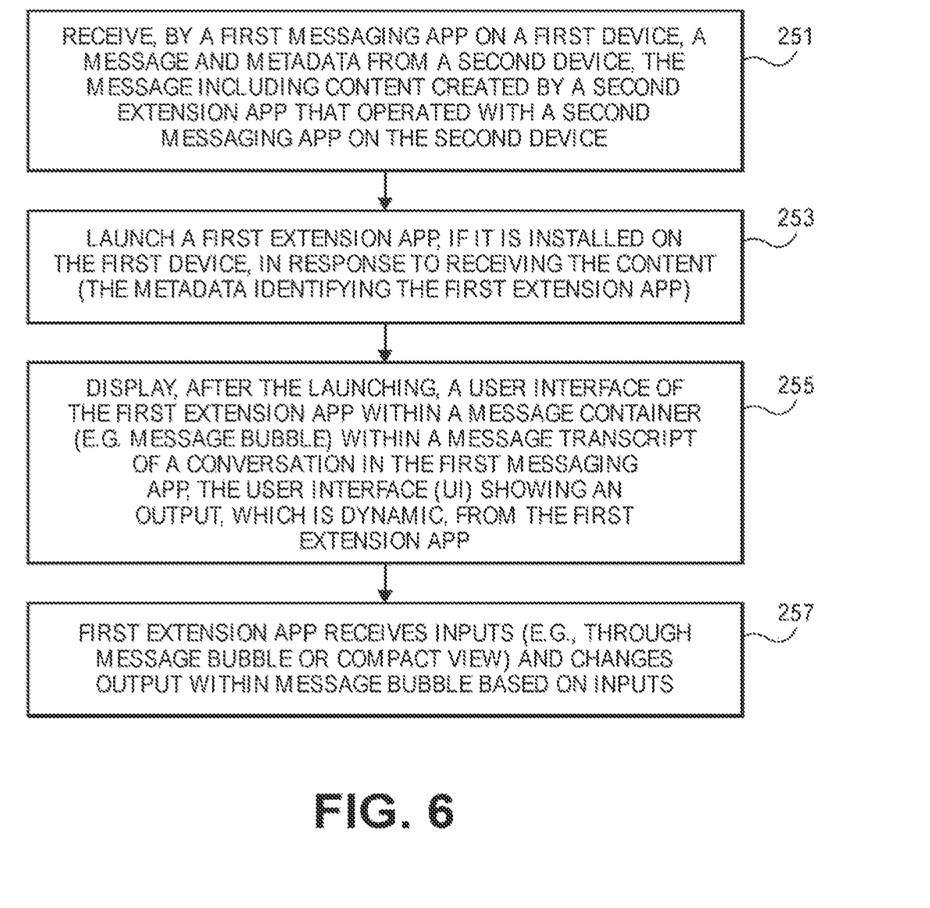
FIG. 6 is a flowchart which illustrates a method according to one embodiment described herein.

FIG. 6 shows an example of a method according to one embodiment which uses a dynamic extension app to generate a dynamic user interface within, for example, a message bubble in a transcript of a messaging app. The method shown in FIG. 6 can be performed with the software architecture shown in FIG. 3A or the architecture shown in FIG. 5 and can result in the display of the transcripts shown in FIGS. 4A, 4B, and 4C. In operation 251, a first messaging app on a first device receives a message and metadata from a second device, where the message includes content created by a second extension app that can be a dynamic extension app that operated with a second messaging app on the second device. In one embodiment, the second device can be a sender's device that has sent the message and metadata from the sender's device to the first device which uses the first messaging app to receive the message and metadata. In operation 253, a first extension app can be launched if it is installed on the first device in response to receiving the content. In one embodiment, the metadata received from the second device can identify the first extension app, and that metadata can be used to determine whether the first extension app is installed on the first device. If the first extension app is not installed, the first messaging app on the first device can offer to download and install the first extension app from an extension app store which can be hosted within the first messaging app as described in U.S. patent application Ser. No. 15/275,136, filed Sep. 23, 2016. In one embodiment, the first extension app may be launched only if the message bubble containing content generated by the first extension app is on-screen within the displayed transcript. In other words, launching of the first extension app may be deferred until it is visible and on-screen in the message transcript. In operation 255, a dynamic user interface of the first extension app can be displayed, after launching, within a message container such as a message bubble within the message transcript provided by the first messaging app. The dynamic user interface provided in operation 255 can show an output, which is dynamic, from the first extension app. Then, in operation 257, the first extension app can receive inputs and change the output within the message bubble based upon the inputs. An example of this change is shown in FIGS. 4A and 4B.

Figure 7:
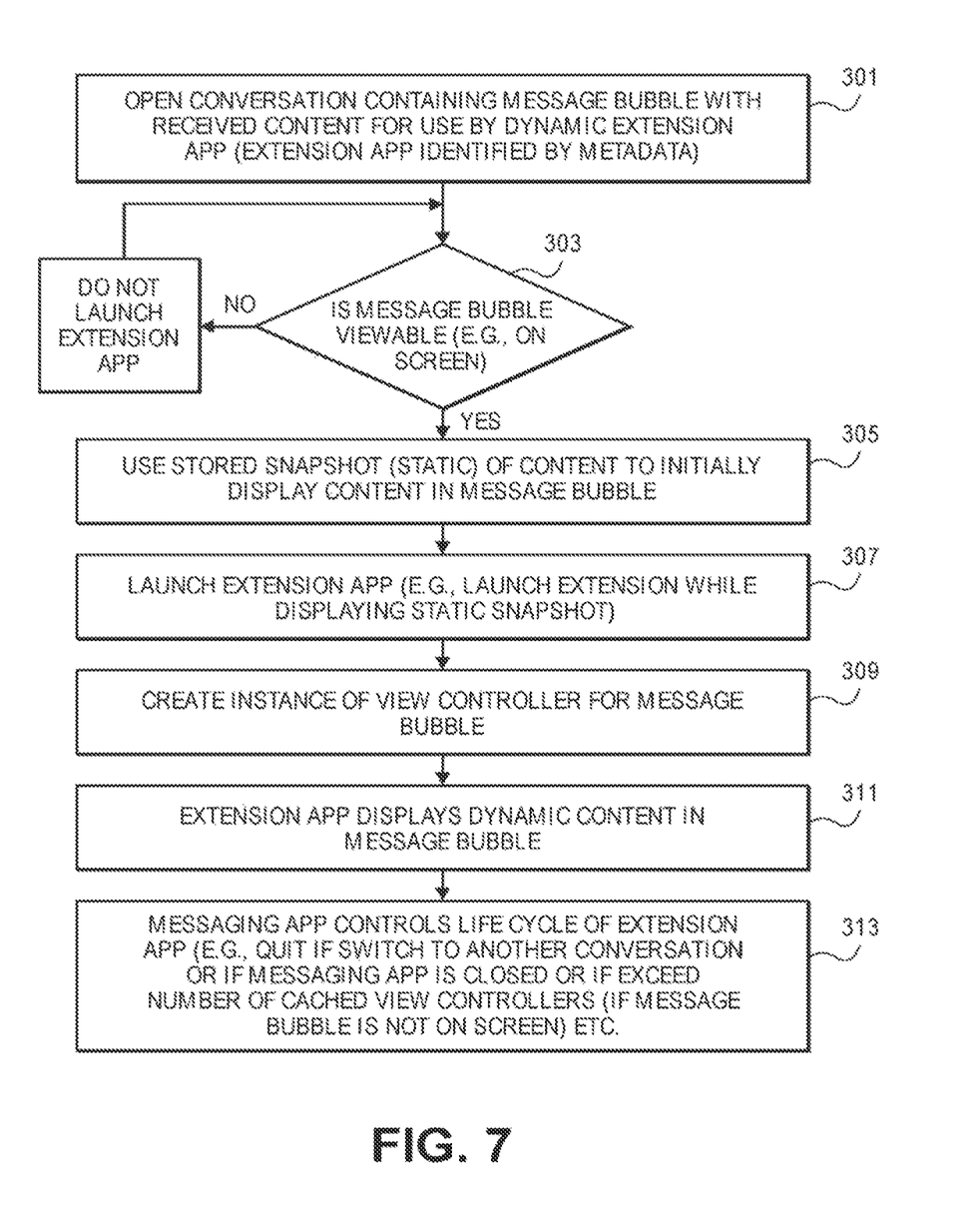
FIG. 7 is a flowchart which illustrates a method according to one embodiment for controlling the lifecycle of an extension app that can generate dynamic content in a message bubble according to one embodiment.
Figure 8A:
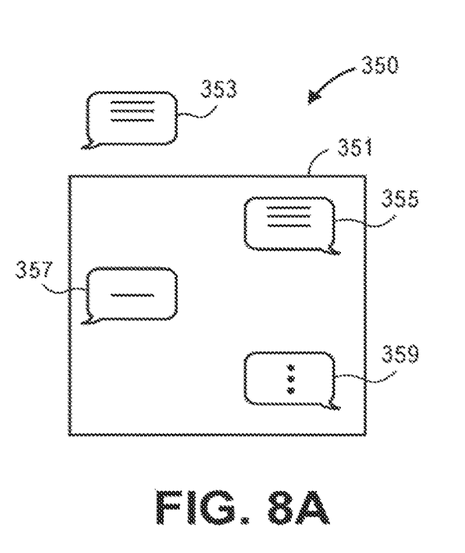
FIG. 8A shows an example of a message transcript in which a message bubble containing dynamic content is outside the viewable portion of the message transcript.
Figure 8B:
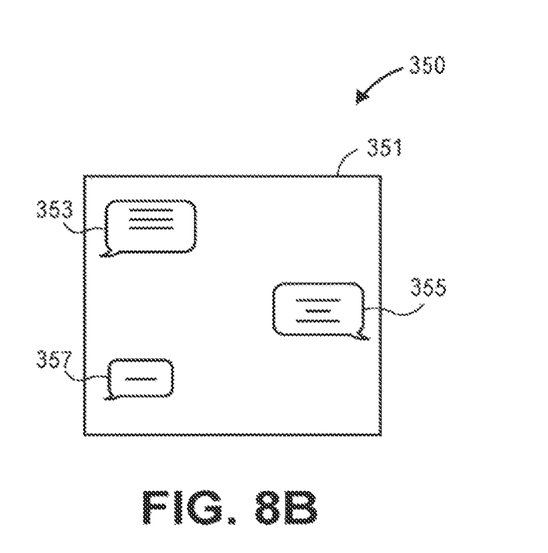
FIG. 8B shows the example of the message transcript shown in FIG. 8A after the transcript has been scrolled in a direction to cause the message bubble containing dynamic content to be viewable in the message transcript.

FIG. 7 shows an example of lifecycle management for a dynamic extension app according to one embodiment. The method can begin in operation 301, in which a user selects a conversation from a list of conversations provided by the messaging app. The selected conversation is opened by displaying a message transcript of the conversation. The message transcript contains a message bubble with received content for use by a dynamic extension app, such as dynamic extension app 83 shown in FIG. 3A. The extension app can be identified by metadata so that it can be launched. In one embodiment, the message bubble containing the dynamic content may have been received many days ago, and hence may not be viewable within the on-screen message transcript. The state of viewability is tested in operation 303 by determining whether the message bubble which contains dynamic content generated by a dynamic extension app is on-screen. If operation 303 determines that the dynamic message bubble is not on-screen, then the extension app identified by the metadata is not launched. This can be seen in FIGS. 8A and 8B, which shows a messaging app 350 that displays a transcript 351. In the situation shown in FIG. 8A, message bubble 353 is outside of the viewable area of the transcript 351. Message bubble 353 contains dynamic content generated by a dynamic extension app, such as dynamic extension app 83. In the example shown in FIG. 7, operation 303 will defer launching the extension app which generated the dynamic content within message bubble 353 until the message bubble 353 appears within the viewable portion of the transcript 351. This can occur when the user scrolls the transcript down to make the message bubble 353 viewable within the on-screen portion of the transcript 351 as shown in FIG. 8B. The result of scrolling down the transcript causes the message bubbles 355 and 357 to move down the screen and also causes the message bubble 359 to move off of the viewable portion of the transcript 351 as shown in FIG. 8B. If operation 303 determines the message bubble is viewable, then operation 305 can follow in which the messaging app uses a stored snapshot, which can be a static image of the dynamic content to initially display content in the message bubble before the dynamic extension app finishes launching. In one embodiment, the stored snapshot can be created by the first extension app during a prior execution of the first extension app (e.g., when the conversation was previously opened and the message bubble was displayed then by the first extension app in the conversation and the snapshot was created then). In another embodiment, the stored snapshot can be created by the second extension app (on the sender's device) and sent to the receiver's device. In operation 307, the dynamic extension app can be launched while the static snapshot is displayed within the message bubble. In operation 309, an instance of a view controller, such as a remote view controller for the message bubble, is created so that the extension app can generate the dynamic user interface for the message bubble. Then in operation 311, the extension app displays the dynamic content in the message bubble. At this point, the user can interact with the message bubble, and FIGS. 4A and 4B provide an example of such a user's interaction with the dynamic content in a message bubble having a dynamic user interface generated by the dynamic extension app. At this point, as shown in operation 313, the messaging app can control the lifecycle of the extension app based upon one or more events or factors. For example, if the user switches to another conversation, the dynamic extension app can be terminated or quit. Similarly, if the messaging app is closed or quit, then the dynamic extension app can be terminated or quit. In one embodiment, if the messaging app is caused to go from the foreground process to a background process, then the dynamic extension app can be terminated. In one embodiment, the dynamic extension app can be terminated if there is memory pressure (such as a low DRAM memory situation). Also, if the message bubble having the dynamic content is not on-screen and the number of cache to view controllers has exceeded a predetermined limit, then the dynamic extension app can be quit or terminated.

FIG. 9 shows an example of a user interface of a messaging app in which a dynamic extension app can generate a dynamic user interface within the input staging area, such as input staging area 407. The messaging app 401 displays a transcript 403 which includes one or more message bubbles. At the bottom of the transcript, the input staging area 407 can be selected by the user to present a user interface of an extension app that is dynamic. In particular, user interface 409 is a dynamic user interface generated by a dynamic extension app that allows the user interface 409 to receive inputs for the dynamic extension app and to provide outputs from the dynamic extension app within the user interface 409 in the input staging area 407. In addition, the dynamic extension app includes the user interface in the compact view 405 which is a further user interface region controlled by the dynamic extension app.

Figure 10:
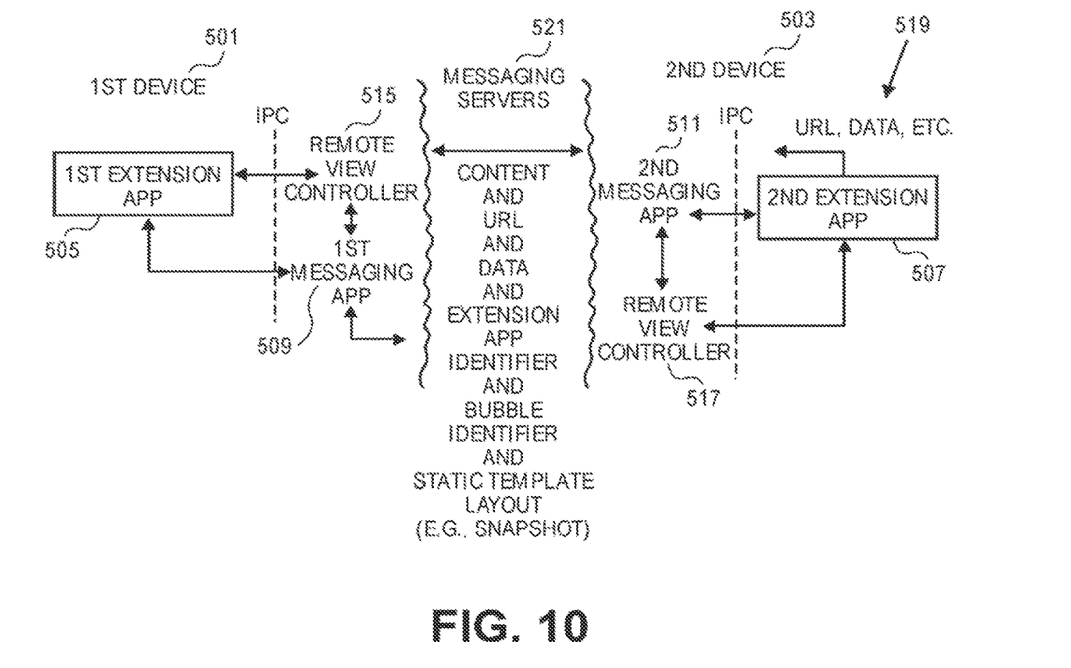
FIG. 10 shows an example according to one embodiment in which extension apps on two or more devices can interact with each other through the messaging apps on each device.

FIG. 10 shows an example of the interaction in a session between two extension apps 505 and 507 on two different devices 501 and 503, where the extension apps can both be dynamic extension apps. A first device 501 includes a first messaging app 509 and a first dynamic extension app 505, and a second device 503 includes a second messaging app 511 and a second dynamic extension app 507. The first dynamic extension app 505 and the second dynamic extension app 507 can have the same app identifier or metadata indicating the apps are the same but different instances of the same app on the two devices. The first device 501 can also include a remote view controller 515 allowing the first dynamic extension app 505 to provide dynamic user interfaces within message bubbles or other items within the messaging app 509. Similarly, the second device 503 can include a remote view controller 517 to allow the second dynamic extension app 507 to provide dynamic user interfaces within message bubbles or other components within the second messaging app 511. The first and second messaging applications can receive dynamic content from their respective dynamic extension apps and transmit them to the other device (through one or more messaging servers 521) which can provide a session between the two dynamic extension apps. FIG. 4B shows an example in which a receiving device has received dynamic content from a remote dynamic extension app and the user (using a local dynamic extension app) has modified the content by entering a number within the dynamic content of the message bubble which can then be sent back (e.g., as URL, data, etc. 519) to the remote extension app through the two messaging apps or through a separate communication channel. For example, in one embodiment, in addition to using the two messaging apps 509 and 511 to exchange data between the two extension apps 505 and 507, the two extension apps 505 and 507 can open a separate and distinct communication channel that does not use the two messaging apps to exchange data. Thus, the URL, data, etc. 519 can be transmitted through the separate and distinct communication channel; moreover, each extension app may communicate with a web server controlled by the developer of the extension apps, etc. and this communication can be through the separate and distinct communication channel. Further information in connection with such sessions between extension apps can be found in U.S. patent application Ser. No. 15/275,136, filed Sep. 23, 2016.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include server systems, desktop computers, laptop computers, tablet computers, smart phones, cellular telephones, personal digital assistants (PDAs), embedded electronic devices, or other consumer electronic devices.

Figure 11:
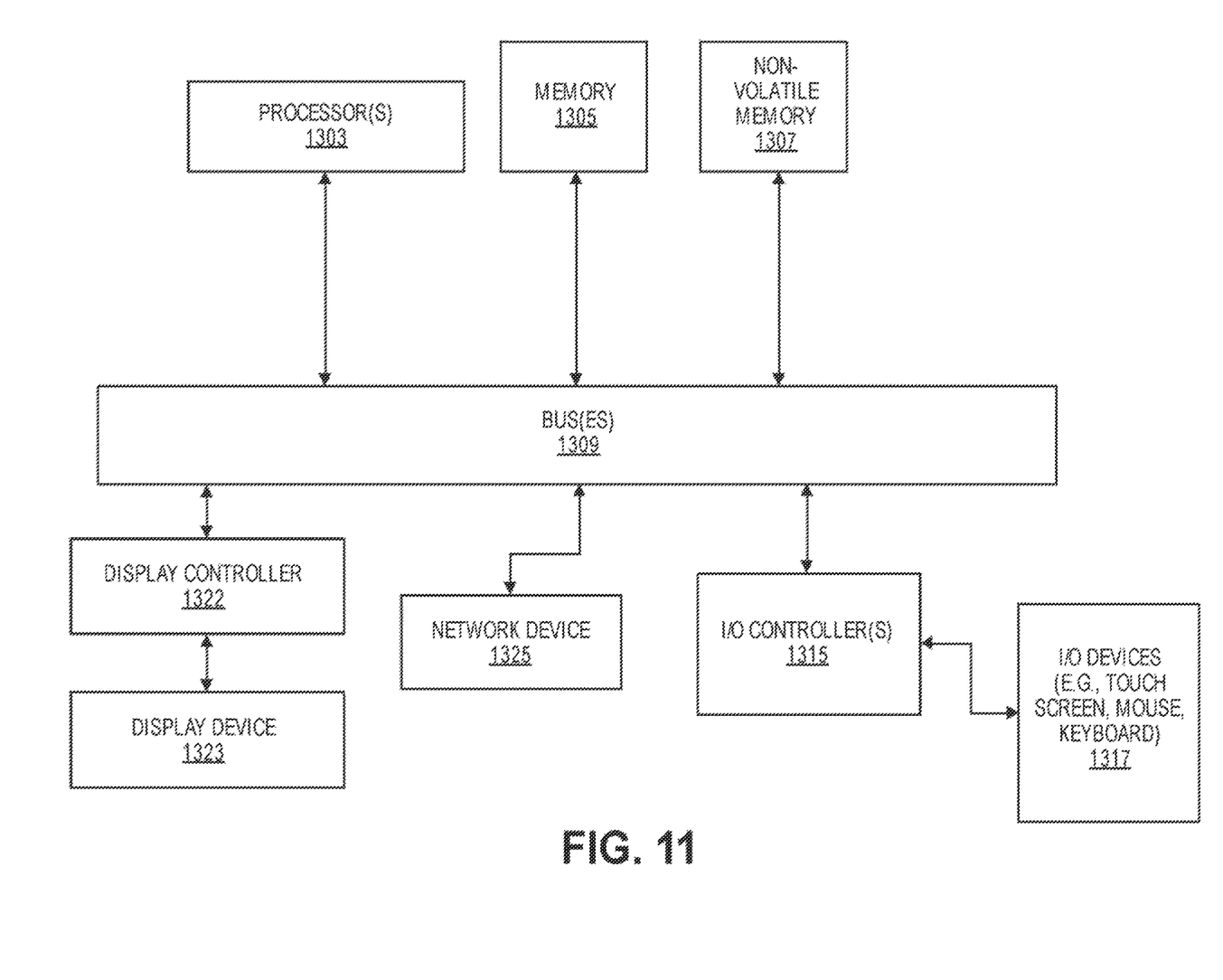
FIG. 11 is an example of a data processing system which can be used with the one or more embodiments described herein.

FIG. 11 is a block diagram of data processing system hardware according to an embodiment. Note that while FIG. 11 illustrates the various components of a data processing system that may be incorporated into a mobile or handheld device or other electronic device, it is not intended to represent any particular architecture or manner of interconnecting the components as such details are not germane to the present invention. It will also be appreciated that other types of data processing systems that have fewer components than shown or more components than shown in FIG. 11 can also be used with the present invention.

As shown in FIG. 11, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems (e.g., ROM) that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 11 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WiFi, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. volatile DRAM or non-volatile flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), speaker systems with integrated computing capabilities, handheld devices (e.g., smartphones), as well as embedded systems suitable for use in wearable electronic devices.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

The following Appendix includes an embodiment of a set of application programming interfaces (API) that allow a set of dynamic extension apps to operate with a messaging app to add dynamic, live user interfaces generated and used by the dynamic extension apps within message bubbles in a transcript of a conversation and other components presented by the messaging app.

What is claimed is:

1. A method comprising:
   displaying, on a device, a user interface of an extension application in a container within a view of an application, the user interface comprising content corresponding to the extension application; and
   displaying an expanded view of the user interface in response to a user input with respect to the container, wherein the expanded view of the user interface overlaps at least a portion of the view external to the container and the user interface is configured to provide output from the extension application.

2. The method of claim 1, wherein the content corresponding to the extension application is received by the application via an inter-process communication.

3. The method of claim 1, wherein receiving, by the application on the device, the content corresponding to the extension application further comprises:
   receiving, by the application on the device, metadata and the content corresponding to the extension application.

4. The method of claim 3, wherein the content is associated with the metadata.

5. The method of claim 4, wherein the extension application is identified by an extension application identifier in the metadata.

6. The method of claim 1, wherein the expanded view of the user interface comprises a selector for receiving a user selection.

7. The method of claim 6, wherein the user selection corresponds to the content.

8. A device comprising:
   a memory; and
   at least one processor configured to:
      display a user interface of an extension application in a container within a view of an application, the user interface comprising content corresponding to the extension application; and
      display an expanded view of the user interface in response to a user input with respect to the container, wherein the expanded view of the user interface overlaps at least a portion of the view external to the container and the user interface is configured to provide output from the extension application.

9. The device of claim 8, wherein the content corresponding to the extension application is received via an inter-process communication.

10. The device of claim 8, wherein the at least one processor is further configured to:
    receive, by the application on the device, metadata including the content corresponding to the extension application.

11. The device of claim 10, wherein the content is associated with the metadata.

12. The device of claim 11, wherein the extension application is identified by an extension application identifier in the metadata.

13. The device of claim 8, wherein the expanded view of the user interface comprises a selector for receiving a user selection.

14. The device of claim 13, wherein the user selection corresponds to the content.

15. A non-transitory machine-readable medium comprises code that, when executed by one or more processors, causes the one or more processors to:
   display a user interface of an first application in a container within a view of a second application on a device, the user interface comprising content; and
   display an expanded view of the user interface in response to a user input with respect to the container, wherein the expanded view of the user interface overlaps at least a portion of the view external to the container and the user interface is configured to provide output from the second application.

16. The non-transitory machine-readable medium of claim 15, wherein the content corresponding to the second application is received via an inter-process communication.

17. The non-transitory machine-readable medium of claim 15, wherein the code, when executed by the one or more processors, further causes the one or more processors to:
   receive, by the first application on the device, the content corresponding to the second application and metadata.

18. The non-transitory machine-readable medium of claim 17, wherein the content is associated with the metadata.

19. The non-transitory machine-readable medium of claim 18, wherein the second application is identified by an application identifier in the metadata.

20. The non-transitory machine-readable medium of claim 15, wherein the expanded view of the user interface comprises a selector for receiving a user selection.

* * * * *

UNITED STATES PATENT AND TRADEMARK OFFICE
CERTIFICATE OF CORRECTION

PATENT NO. : 12,120,585 B2  
APPLICATION NO. : 18/231230  
DATED : October 15, 2024  
INVENTOR(S) : Stephen M. Lottermoser et al.

Page 1 of 1

It is certified that error appears in the above-identified patent and that said Letters Patent is hereby corrected as shown below:

On the Title Page

Under Item (57) Abstract:
Replace: "second messaging on can" with --second messaging app can--.

Signed and Sealed this
Twenty-fourth Day of December, 2024

Derrick Brent
*Acting Director of the United States Patent and Trademark Office*